United States Patent Office 3,295,478
Patented Jan. 3, 1967

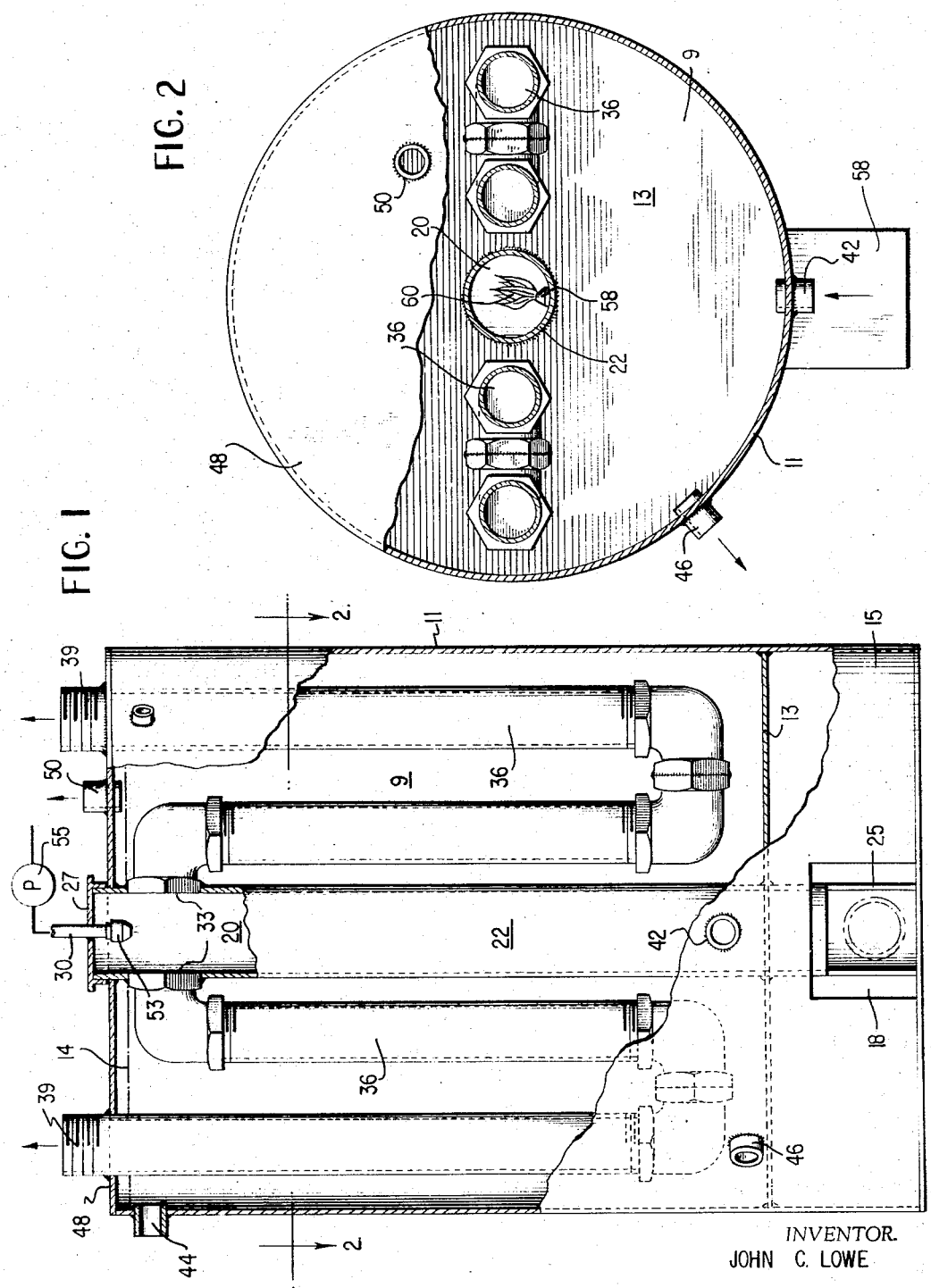

3,295,478
INCINERATION OF LIQUID WASTES
John C. Lowe, Broadway, N.J., assignor to Broadway Research and Development Corp., a corporation of Pennsylvania
Filed Dec. 2, 1963, Ser. No. 327,308
2 Claims. (Cl. 110—10)

This invention is a method for the combustion of liquids and an apparatus designed to perform the method with a minimum loss of heat values. The invention is particularly of value for the total destruction of liquid wastes.

Many industrial processes exist in which organic liquid wastes are produced and the increased attention being focused upon stream pollution and other effects of currently practiced waste disposal techniques may in time lead to an outright prohibition against discharging certain wastes to streams, city sewage systems or even septic tanks. The method and apparatus of this invention may be used for the incineration of such organic wastes. This invention may be used, for example, to treat the synethetic detergent wastes accumulated in the practice of the invention of my copending application Serial No. 304,183, filed August 23, 1963. Although the instant invention will be described in terms of synthetic detergent concentrate disposal it will be apparent to those of ordinary skill in the art that other liquid organic wastes may be likewise treated.

In this invention liquid organic wastes are burned by dispensing the wastes in finely divided form into a stream of hot gases containing oxygen. The temperature and amount of gas is sufficient to vaporize enough of the non-combustible liquid portion of the waste that the free oxygen content of the gas is sufficient to burn the combustile, often non-vaporizable, portions of the waste. The hot gas preferably is a flue gas produced by burning a fuel in an excess of oxygen; the fuel, in turn is generally a carbonaceous gas, liquid or solid, for example, city gas, natural gas, LP gas, fuel oil, coat, coke, etc.

In this invention the heat content of the exhaust gas from waste burning is conveniently exploited by locating the combustion zone within a body of process liquid to be heated. Also the exhaust gases from the combustion zone may be additionally passed in indirect heat exchange with the process liquid to be heated. By finely dividing or even atomizing the liquid waste and by exploiting the heat values, the process and apparatus of this invention makes the burning of many organic liquid wastes, which in themselves are insufficient for combustion in cool air, or in massive form economically feasible.

The apparatus of the invention is of simple construction and comprises, in general, a tank having a waste combustion chamber therein. This combustion chamber is elongated to provide a passage sufficient for evaporation of non-combustile liquid and burning of the combustible portion of the liquid waste. The combustion chamber is provided at one end with a nozzle for entry of the atomized liquid waste and at the other end with an entry for hot free-oxygen-containing gas. Preferably, the combustion chamber is arranged vertically, the nozzle is placed at the upper end and positioned for downward spraying of the liquid waste and entry of hot gas is provided for at the bottom end of the combustion chamber.

The combustion chamber is also provided with one or more exits for exhaust gas and these exits, in turn, lead to heat exchange means, e.g., fluid conduits passing through the tank. The fluid conduits preferably are convoluted to provide an elongated flow path for exhaust gas in indirect heat exchange with the process fluid in the tank. The tank, outside of the exhaust-gas conduits, is provided with an entry and an exit for the process liquid to be heated. The tank with the generally vertically arranged combustion chamber contained therein is supported in such fashion as to leave room under the bottom of the combustion chamber for the entry of the hot gas and advantageously enough room is provided for placing a hot gas generator directly beneath the hot gas entry for the combustion chamber. Thus provision may be made for placing an oil, gas or other burner directly beneath the combustion chamber.

The invention will be better understood from a consideration of the accompanying drawing in which:

FIGURE 1 is a side view, partly cut away, of the preferred apparatus for performing the process of this invention; and FIGURE 2 is a cross-sectional view along the line 2—2 of FIGURE 1, showing also a fuel burner.

The figures show a tank 9 having the liquid-tight side 11, which preferably is cyclindrical, and the bottom 13. The tank is shown as containing a process liquid 14 which is to be heated. As can be seen, the sides 11 may conveniently be extended downward below the bottom 13 to form the support member 15. This support provides one or a plurality of openings 18 for entry of gas to the combustion chamber. Any ash formed in the combustion and not carried away in the exhaust gas may accumulate adjacent the bottom of the support whence it may be removed as desired.

In the embodiment shown, the combustion chamber 20 is formed by the tube 22 which also is preferably cylindrical. As can be seen, a portion 25 of the tube may be extended downwardly to support the combustion chamber while providing for entry of hot free-oxygen-containing gas. The top of the combustion chamber 20 may be provided with the cover 27 which contains a hole for entry of the waste line 30. The cover 27 may be merely a loose cap. The combustion chamber 20 is also provided with exhaust gas outlets 33 which lead to conduits 36 which, as shown, wind through the tank 9, venting to the atmosphere or to a stack at 39, outside the tank. The tank is provided with one or more process fluid, e.g., water, entry openings, such as at 42 and one or more water exit lines, such as 44. The tank may also be provided with a normally closed drain opening such as 46 for removal, when necessary, of sludge, corrosion products, etc., from the tank and when a top such as 48 is provided it will usually contain a vent such as 50 for removal of gases accumulating in the tank.

The waste line 30 is provided with an atomizing nozzle 53 within the combustion chamber and usually will also be associated with a pump, as at 55 for insuring flow of the liquid waste. The pump 55 also may be such as to mix the liquid waste with atomizing air. Also, as can be readily seen, the elevated position of the chamber 20 and the provsion of the opening 18, allow a fuel burner 58 such as a gas burner or fuel oil burner to be placed directly under the combustion chamber. Such provision usually will obviate the need for any further means for introduction of hot free-oxygen-containing gas to the combustion chamber, the flames 60 from the burner usually being of sufficient force to draw excess air into the chamber.

In operation it has been found that a waste detergent solution containing about 10% combustible sulfonate detergent, the balance water may be incinerated at about 1400° F. in the combustion chamber, the liquid waste being supplied to the nozzle at about 100 p.s.i.g. and a rate of about 6 gallons/hour. A combustion chamber constructed of light weight boiler tube has been found satisfactory.

It is claimed:
1. A method for the incineration of liquid wastes and the exploitation of heat values which comprises dispensing a finely divided stream of the wastes into the upper part of a vertical combustion zone held in indirect heat exchange relation with a liquid to be heated, passing simultaneously and upwardly from the lower end of said combustion zone a stream of hot gas sufficient to vaporize non-combustible portions of the wastes and containing free oxygen sufficient to burn the combustile portions of the waste.

2. An apparatus of the type described comprising a tank for liquid to be heated, an elongated vertical combustion chamber within the tank having means at the upper end for the introduction of liquid wastes in finely divided form and a fuel burner at the lower end of said combustion zone for simultaneously passing upwardly into said combustion zone hot gases sufficient to vaporize non-combustile portions of the wastes and containing free oxygen sufficient to burn the combustile portions of the waste.

References Cited by the Examiner

UNITED STATES PATENTS

| | | | |
|---|---|---|---|
| 1,691,462 | 11/1928 | Borge | 110—10 X |
| 1,771,829 | 7/1930 | Wagner | 23—277 |
| 2,242,653 | 5/1941 | Maxwell | 110—7 |
| 2,474,417 | 6/1949 | Gillen | 122—149 X |
| 2,532,527 | 12/1950 | Woolery | 122—149 X |
| 2,594,267 | 4/1952 | Wilcoxson | 122—336 X |
| 2,648,950 | 8/1953 | Miller | 110—7 |
| 2,747,552 | 5/1956 | Kyrklund | 122—31 |
| 3,053,615 | 9/1962 | Steinert. | |
| 3,078,840 | 2/1963 | Day | 126—360 |

FOREIGN PATENTS

| | | |
|---|---|---|
| 1,166,327 | 6/1958 | France. |
| 869,740 | 6/1961 | Great Britain. |

FREDERICK L. MATTESON, JR., *Primary Examiner.*

JOHN J. CAMBY, ROBERT A. O'LEARY, *Examiners.*

H. B. RAMEY, *Assistant Examiner.*